United States Patent [19]

Howard

[11] Patent Number: 4,825,325
[45] Date of Patent: Apr. 25, 1989

[54] MAGNETORESISTIVE READ TRANSDUCER ASSEMBLY

[75] Inventor: James K. Howard, Morgan Hill, Calif.

[73] Assignee: International Business Machines Corporation, Armonk, N.Y.

[21] Appl. No.: 115,142

[22] Filed: Oct. 30, 1987

[51] Int. Cl.⁴ ............................................. G11B 5/30
[52] U.S. Cl. .................................................. 360/113
[58] Field of Search ............................... 360/113, 126

[56] References Cited

U.S. PATENT DOCUMENTS

| | | | |
|---|---|---|---|
| 4,103,315 | 7/1978 | Hempstead et al. | 360/110 |
| 4,608,293 | 8/1986 | Wada et al. | 428/141 |
| 4,610,935 | 9/1986 | Kumasaka et al. | 428/632 |
| 4,663,685 | 5/1987 | Tsang | 360/113 |

OTHER PUBLICATIONS

IBM Tech. Discl. Bull., vol. 18, No. 10, Mar. 1976, p. 3422, entitled "Exchange Coupled Magnetic Recording Structure" by L. Missel and D. A. Nepela.

*Primary Examiner*—A. J. Heinz
*Attorney, Agent, or Firm*—Otto Schmid, Jr.

[57] ABSTRACT

A magnetoresistive (MR) sensor which is provided with longitudinal bias by means of exchange coupling between the ferromagnetic MR layer (NiFe) and an ultrathin layer of an antiferromagnetic material (FeMn) with a thickness within the range of about 25 to 200 angstroms. The exchange structure is capped by a protective film to prevent oxidation damage to the exchange structure during subsequent thermal cycling. The capping layer is a dielectric or metal oxide (cermet) film such as $Cr_2O_3$, $Al_2O_3$, Cr - SiO or $SiO_2$. Alternatively, the capping layer can be a laminated FeMn-Lx film where Lx is taken from the group consisting of $Cr_2O_3$, $Al_2O_3$, and $SiO_2$.

17 Claims, 4 Drawing Sheets

MAGNETORESISTIVE READ TRANSDUCER ASSEMBLY

BACKGROUND OF THE INVENTION

1. Field of the Invention

This invention relates in general to magnetic transducers for reading information signals from a magnetic medium and, in particular, to an improved magnetoresistive read transducer assembly.

2. Description of the Prior Art

The prior art discloses a magnetic transducer referred to as a magnetoresistive (MR) sensor or head which has been shown to be capable of reading data from a magnetic surface at great linear densities. An MR sensor detects magnetic field signals through the resistance changes of a read element made from a magnetoresistive material as a function of the amount and direction of magnetic flux being sensed by the MR element.

The prior art also teaches that in order for an MR element to operate optimally, various bias fields should be provided. One bias field which is usually employed with MR elements is referred to in the art as the longitudinal bias field which extends parallel to the surface of the magnetic medium and parallel to the lengthwise direction of the MR element.

Commonly assigned U.S. Pat. No. 4,103,315 discloses the use of antiferomagnetic-ferromagnetic exchange coupling to produce a uniform longitudinal bias along the MR sensor. The exchange coupling occurs at the interface between an fcc (face-centered-cubic) FeMn antiferromagnetic layer and a NiFe ferromagnetic layer.

One of the problems encountered with the use of FeMn is the high corrosion rate exhibited by this material when exposed to certain environments. The high atmospheric corrosion rate and the loss of FeMn during processing of the transducer are indicative of the reactive nature of FeMn. The reactive nature of FeMn also causes severe restraints on the vacuum tooling and increases processing time because of the long cycle times required to insure an acceptable vacuum.

SUMMARY OF THE INVENTION

It is therefore the principal object of this invention to provide a magnetoresistive read transducer assembly with enhanced exchange and magnetic properties that are stable during thermal cycling.

It is a further object to provide a magnetoresistive read transducer assembly having improved corrosion protection for the FeMn without causing a decrease in the exchange bias field.

In accordance with the invention, a magnetoresistive (MR) read transducer assembly comprises a thin film of MR conductive layer, an ultrathin film of antiferromagnetic material in direct contact with the MR conductive layer, and a capping layer in contact with the thin film of antiferromagnetic material to protect the layer of antiferromagnetic material from damage due to exposure to adverse environments.

In a specific embodiment the antiferromagnetic material is FeMn and the thickness of the antiferromagnetic layer is in the range of about 25–200 angstroms and the capping layer is either a dielectric material such as $Cr_2O_3$, $Al_2O_3$ and $SiO_2$ or a metal oxide cement film such as Cr - SiO, $Ni_{80}Cr_{20}$ - $Cr_2O_3$, Cr - $Al_2O_3$, and $Ni_{80}Cr_{20}$ - $SiO_2$.

In a further embodiment the antiferromagnetic layer is a ternary alloy Fe Mn - X where X is Rh, Ti or Cr.

The foregoing and other objects, features and advantages of the invention will be apparent from the following more particular description of a preferred embodiment of the invention as illustrated in the accompanying drawings.

DESCRIPTION OF THE PREFERRED EMBODIMENT

Figure 1:
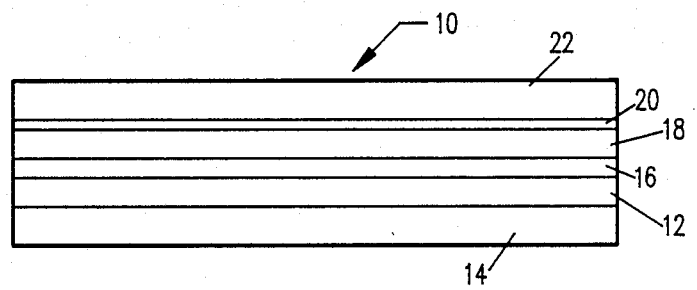
FIG. 1 is an end view of a specific embodiment of an MR read transducer assembly embodying the invention.

With reference to FIG. 1, a magnetoresistive (MR) read transducer assembly 10 is shown which comprises a layer of soft magnetic material 12 on a suitable substrate 14. A non-magnetic spacer layer 16 separates the soft magnetic layer 12 from the layer of MR material 18 which is formed of ferromagnetic material such as nickel-iron (NiFe) The soft magnetic layer 12 provides a magnetic field oriented to bias the magnetic field in the MR layer 18 in a direction non-parallel to the recording medium. This bias field is normally referred to as the transverse bias field, and the transverse bias maintains the MR layer 18 in a linear response mode so that the signal detected across the MR layer is substantially a linear function of the resistance changes sensed in the MR layer due to changes in the magnetic field intercepted by the MR layer 16 from recorded data on the magnetic storage medium.

A second bias field, the longitudinal bias field, is produced by exchange coupling between the ferromagnetic MR layer 18 and an antiferromagnetic material deposited in a layer 20 intimately in contact with the layer 18 of MR material. The longitudinal bias creates a single domain state in MR layer 18, and the single domain state is essential to suppress Barkhausen noise which is associated with MR materials which exhibit multiple magnetic domain states.

The previously discussed Hempstead et al patent discusses exchange coupling between ferromagnetic and antiferromagnetic materials, and this patent suggests NiFe as the ferromagnetic MR layer and a gamma phase (face-centered-cubic (FCC)) of manganese (Mn) alloy as the antiferromagnetic layer. Of the possible gamma Mn alloys mentioned, iron-manganese (FeMn) appears to exhibit the greatest ability to exchange couple with the NiFe layer. However, as discussed previously, a problem exists with the use of FeMn due to its susceptibility to corrosion.

The present invention is directed to an improved structure to provide longitudinal bias by exchange coupling between a ferromagnetic layer and an antiferromagnetic layer which has not only greatly reduced susceptibility to corrosion but also has the strength of the exchange bias field enhanced.

It was unexpectedly discovered that ultrathin layers of the antiferromagnetic material produce a stronger exchange bias field with NiFe than structures that have been studied before. It was further discovered that the corrosion properties of the ultrathin antiferromagnetic layer can be substantially enhanced by providing a capping layer in contact with the antiferromagnetic layer.

In the embodiment shown in the drawings, there is provided an ultrathin layer 20 (25-200 angstroms) of a suitable aniferromagnetic material such as FeMn in direct contact with the MR layer 18. It was discovered that films as thin as 25 to 50 angstroms can exchange couple to NiFe and produce a large exchange bias field. The results are somewhat surprising since films in that thickness range may still be discontinuous.

A capping layer 22 is provided in contact with the ultrathin layer 20 of antiferromagnetic material to protect the antiferromagnetic layer from corrosion damage and also to serve as a diffusion barrier since any interdiffusion into the layer of antiferromagnetic material will destroy the exchange coupling. The capping layer 22 is made of a stable dielectric material such as $Cr_2 Cr_3$, $Al_2 O_3$, and $Si O_2$ or a metal oxide cement film such as $Cr$ - $Si O$, $Ni_{80} Cr_{20}$ - $Cr_2 O_3$, $Cr$ - $Al_2 O_3$, and $Ni_{80} Cr_{20}$ - $Si O_2$. The thickness of capping layer 22 is not critical, and capping layers within the range of about 200-400 angstroms have been found to be suitable.

In order to provide an improved antiferromagnetic layer in an MR sensor, various FeMn structures were prepared as thin films by RF sputter deposition in a uniform magnetic field of 100 Gauss. The power density, system pressure and substrate temperature were fixed at 2.6 w/cm$^2$, 25 millitorr and 50° C. respectively. The substrate was glass and the surface was sputter cleaned for five minutes prior to deposition. Films of nickel-iron ($Ni_{81} Fe_{19}$) were deposited on the substrate at a rate of about one angstrom per second to a thickness of about 400 angstroms. The nickel-iron film deposition was followed by the sputter deposition of $Fe_{50} Mn_{50}$ of variable thickness from 25 angstroms to 350 angstroms. The deposition of FeMn was at the rate of about 1.5 angstroms per second at the same pressure and power density as before. The thickness values were established by sputter power and time and were calibrated to step height measurements. The exchange structure was capped by a protective cement film such as $Cr$ - $Si O$ about 300 angstrom thick. The capping layer provided a protective coating to prevent the exchange structure from oxidation during thermal cycling experiments.

Figure 4:
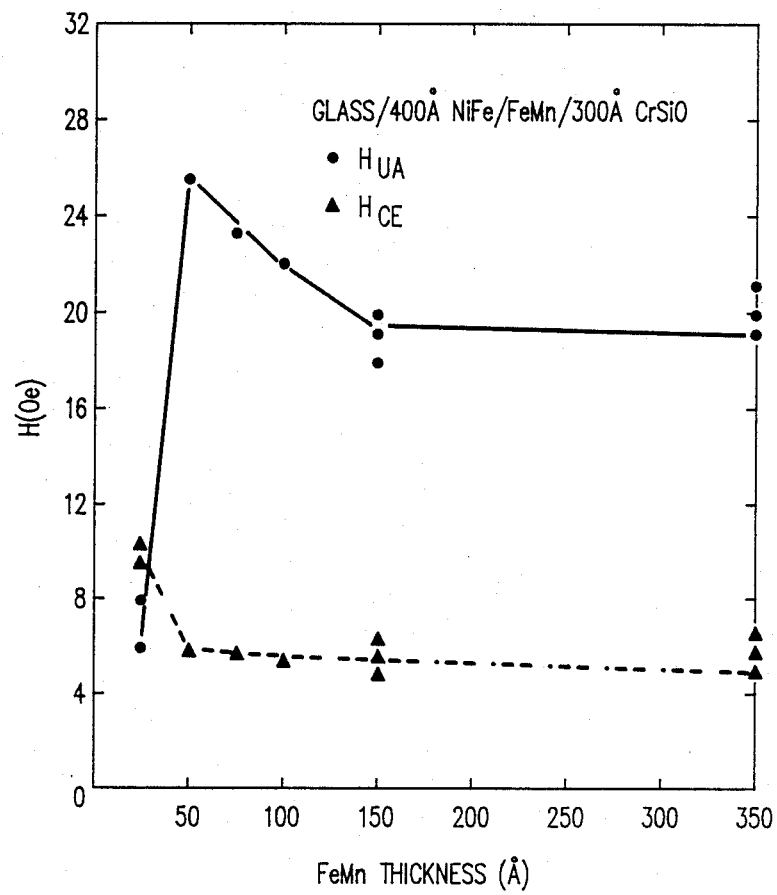
FIG. 4 is a plot of exchange bias field and coercivity as a function of thickness of the FeMn layer in the MR read transducer assembly FIG. 1.

The exchange bias field ($H_{UA}$) of the NiFe MR layer is illustrated in FIG. 4 as a function of thickness of the FeMn antiferromagnetic layer. Also shown in FIG. 4 is the exchange coercivity ($H_{CE}$) as a function of $Fe_{50} Mn_{50}$ thickness. These plots show that the coercivity was greater than the exchange bias when the FeMn thickness was 25 angstroms. However, the exchange increased to 25 oersteds (Oe) for a 50 angstrom FeMn layer and the coercivity decreased to about 6 Oe. The maximum exchange bias field observed was for a 50 angstrom FeMn film and the exchange decreased linearly to 20 Oe at 150 angstroms of FeMn and remained independent of thickness up to 350 angstroms.

Another experiment was conducted in which the capping layer was about 300 angstroms thick of FeMn laminated with $Cr_2 O_3$, and in this case the exchange bias field peaked in the 25-50 angstrom range, decreased linearly to about 200 angstroms and remained independent of thickness up to 350 angstroms. The laminated capping layer structure will be described in greater detail below.

Figure 5:
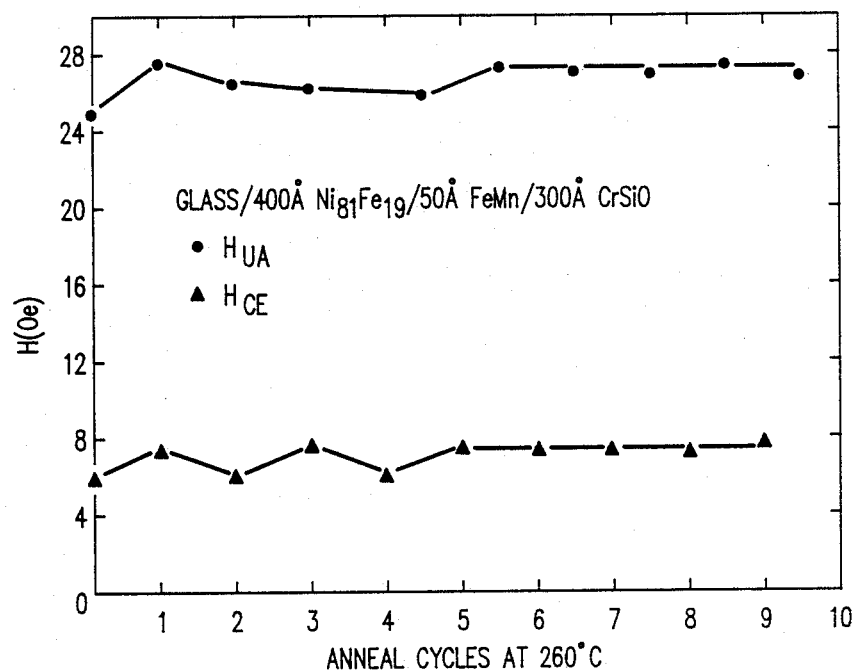
FIG. 5 is a plot of exchange bias field and coercivity vs number of anneal cycles for the structure of FIG. 1 with 50 angstroms of FeMn.

During the manufacturing process for a specific embodiment of a magnetic read/write transducer in which an MR read transducer is a part, a number of thermal cycles are used which have the effect of annealing the thin films comprising the magnetic head. It is desirable that neither the exchange bias field $H_{UA}$, nor the exchange coercivity $H_{CE}$ change as a result of the thermal cycling. The thermal cycling properties of an MR read transducer, such as that depicted in FIG. 4, having an FeMn film thickness of 50 angstroms, is shown in FIG. 5. Neither the exchange bias field $H_{UA}$ nor the exchange coercivity $H_{CE}$ exhibit any significant change in properties after 9 cycles at 260 degree C. Each of these cycles comprises of four hours at temperature and a 12-hour cool down to room temperature.

Figure 6:
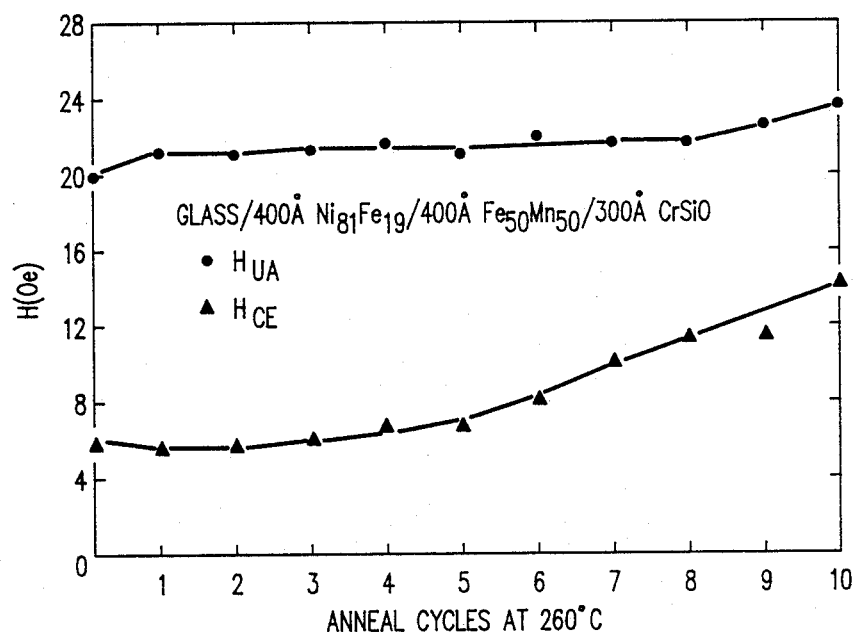
FIG. 6 is a plot of exchange bias field and coercivity vs number of anneal cycles for the structure of FIG. 1 with 400 angstroms of FeMn.

The stability of the ultrathin FeMn film and the exchange properties are somewhat surprising considering the thickness involved in the exchange interface. In contrast, FIG. 6 shows the thermal cycling properties of a similar structure which has a FeMn film thickness of 400 angstroms. Note that in this case both the exchange bias field and the exchange coercivity change substantially with thermal cycling.

Electron diffraction experiments have shown that the dependence of exchange coupling on FeMn thickness is related to the FeMn phase stability. When the FeMn thickness is in 25-200 angstrom range (on Ni Fe), the FeMn phase is for the most part single phase fcc. However, when the FeMn thickness exceeds a critical thickness (~150-200 angstroms), then the FeMn is composed of both the fcc ($\gamma$ phase) and a bcc (body-centered-cubic) $\alpha$ M n phase which is not antiferromagnetic at room temperature. When the FeMn is thin and single phase fcc it is believed to be more stable during thermal processing than when the FeMn is composed of both the fcc ($\gamma$ phase) and the bcc ($\alpha$ Mn) phase (See FIGS. 5 and 6).

Figure 2:
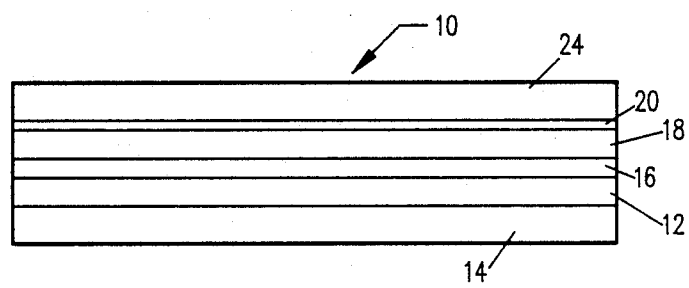
FIG. 2 is an end view of an alternate embodiment of an MR read transducer assembly embodying the invention.

An alternate embodiment of the invention is shown in FIG. 2 in which similar components of the MR read transducer assembly are given the same reference numerals as the embodiment shown in FIG. 1. Note however that the capping layer 24 is constructed in a different manner although the function of the capping layer is the same. In this embodiment, the capping layer 24 comprises a laminated structure FeMn - Lx where X comprises stable oxides, carbides, nitrides or carbon. The basic concept is that the exchange coupling depends only on the ultrathn layer 20 of FeMn and the capping layer 24 comprises MnFe laminated with high resistivity (or insulating) layers which are inert to many corrosive environments, and the materials of the capping layer can actually improve the mechanical integrity of the FeMn layer. Since the oxide phases such as $Al_2 O_3$, $Cr_2 O_3$, $Si O_2$, etc. exhibit low diffusivity, they are very stable at 200-300 degrees C and provide excellent diffusion barriers near the exchange interface.

Figure 3:
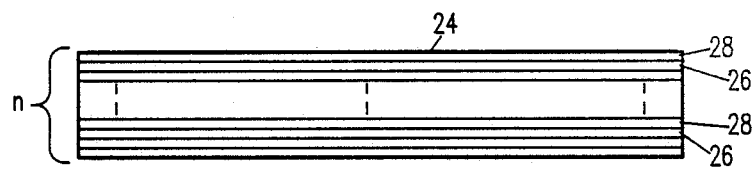
FIG. 3 is an enlarged view of the laminated capping structure of FIG. 2.

The capping layer 24 is shown in expanded form in FIG. 3. The capping layer comprises alternating layers 26 of FeMn with layers 28 of the high resistivity material such as $Cr_2O_3$, $Al_2O_3$, $SiO_2$ and carbon, for example. The capping layer 24 is produced by co-sputtering FeMn and the high resistivity material with both sources ON simultaneously while rotating at a speed of 10 to 40 rpm. The thickness of the individual laminations is dependent on the rotating speed and did not appear to be critical. The capping layer 24 is formed of n laminations to a total thickness in the range of 300 angstroms which also did not appear to be critical.

Figure 7:
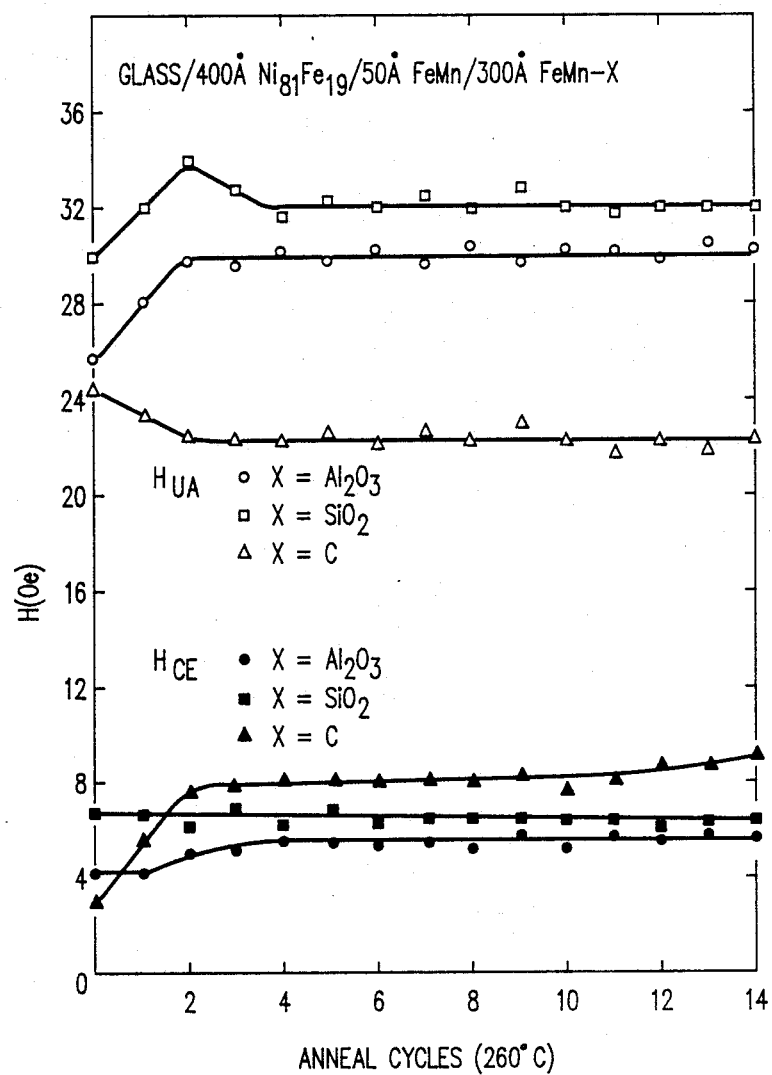
FIG. 7 a plot of exchange bias field and coercivity vs number of anneal cycles for the structure of FIGS. 2 and 3 in which the capping layer is FeMn with either $Al_2O_3$, $Cr_2O_3$ or carbon.

FIG. 7 shows thermal cycling data for a laminated capping layer on a FeMn film 50 angstroms thick in which three different laminating materials, $Al_2O_3$, $SiO_2$ and carbon are used. Both the exchange bias field $H_{UA}$ and the exchange coercivity $H_{CE}$ are substantially stable with thermal cycling with $SiO_2$ showing the highest exchange, while the carbon structure showed the lowest exchange as well as the greatest change in coercivity with thermal cycling.

While the experimental data shows that a capping layer having a laminated structure of FeMn with $Cr_2O_3$, $Al_2O_3$ and $SiO_2$ produces high exchange field that is stable with thermal cycling, it is possible to conclude that $HfO_2$, $ZrO_2$ and $Ta_2O_5$ may also produce acceptable device performance when included in a laminated capping layer structure with FeMn.

There is evidence that the addition of small amounts of a third element to FeMn to produce ternary alloys can result in improved characteristics. In particular, small amounts of titanium (Ti), rhodium (Rh) or chromium (Cr) lead to ternary alloys having improved characteristics. For this reason the layer 20 of antiferromagnetic material in either FIG. 1 or FIG. 2 may comprise Mn Fe-X where X is Ti, Rh or Cr.

The dependence of exchange coupling on FeMn thickness seems to be a basic materials property rather than depending on processing systems since essentially the same thickness dependence was noted in sputtering systems with higher base pressures, in the $10^{-7}$ torr range, for example.

While the invention has been particularly shown and described with reference to a preferred embodiment thereof, it will be understood by those skilled in the art that various other changes in the form and details may be made therein without departing from the spirit and scope of the invention.

Having thus described my invention, what I claim as new, and desire to secure by Letters Patent is:

1. A magnetoresistive read transducer assembly comprising:
   a thin film of magnetoresistive conductive layer; and
   an ultrathin film of antiferromagnetic material in direct contact with said magnetoresistive layer, said ultrathin film of antiferromagnetic material having a thickness within the range of about 25 to 99 angstroms thereby producing an exchange bias field between said films which is relatively high and remains stable during subsequent thermal cycling.

2. The magnetoresistive read transducer assembly of claim 1 wherein said antiferromagnetic material is FeMn - X where X is Rh, Ti or Cr.

3. The magnetoresistive read transducer assembly of claim 1 wherein said antiferromagnetic material is FeMn.

4. A magnetoresistive read transducer assembly comprising:
   a thin film of magnetoresistive conductive layer;
   an ultrathin film of antiferromagnetic material having a first and second major surface, said first major surface being in direct contact with said magnetoresistive layer; and
   a capping layer comprising a high resistivity material in contact with said second major surface of said ultrathin film of antiferromagnetic material to protect said ultrathin film of antiferromagnetic material from damage due to adverse environments.

5. The magnetoresistive read transducer assembly of claim 4 wherein said capping layer comprises a laminated structure comprising alternating thin films of FeMn and a dielectric material.

6. The magnetoresistive read transducer assembly of claim 4 wherein said ultrathin film of antiferromagnetic material has a thickness within the range of about 25 to 200 angstroms.

7. The magnetoresistive read transducer assembly of claim 6 wherein said antiferromagnetic material is FeMn.

8. The magnetoresistive read transducer assembly of claim 7 wherein said high resistivity material is a dielectric material.

9. The magnetoresistive read transducer assembly of claim 8 wherein said dielectric material is taken from the group comprising $Cr_2O_3$, $Al_2O_3$, and $SiO_2$.

10. The magnetoresistive read transducer assembly of claim 7 wherein said high resistivity material is a metal oxide cement material.

11. The magnetoresistive read transducer assembly of claim 10 wherein said metal oxide cement material is taken from the group consisting of Cr - SiO, $Ni_{80}Cr_{20}$ - $Cr_2O_3$, Cr - $Al_2O_3$, and $Ni_{80}Cr_{20}$ - $SiO_2$.

12. The magnetoresistive read transducer assembly of claim 7 wherein said capping layer comprises a laminated structure comprising alternating thin films of FeMn and a dielectric material.

13. The magnetoresistive read transducer assembly of claim 6 wherein said antiferromagnetic material is FeMn - X where X is Rh, Ti or Cr.

14. The magnetoresistive read transducer assembly of claim 4 wherein said high resistivity material is a dielectric material.

15. The magnetoresistive read transducer assembly of claim 14 wherein said dielectric material is taken from the group consisting of $Cr_2O_3$, $Al_2O_3$, and $SiO_2$.

16. The magnetoresistive read transducer assembly of claim 4 wherein said high resistivity material is a metal oxide cermet material.

17. The magnetoresistive read transducer assembly of claim 16 wherein said metal oxide cermet material is taken from the group consisting of Cr - SiO, $Ni_{80}Cr_{20}$ - $Cr_2O_3$, Cr - $Al_2O_3$, and $Ni_{80}Cr_{20}$ - $SiO_2$.

* * * * *

UNITED STATES PATENT AND TRADEMARK OFFICE
CERTIFICATE OF CORRECTION

PATENT NO. : 4,825,325

DATED : April 25, 1989

INVENTOR(S) : J. K. Howard

It is certified that error appears in the above-identified patent and that said Letters Patent is hereby corrected as shown below:

IN THE SPECIFICATION

Column 2, line 19, "read transducer assembly FIG. 1." should be --read transducer assembly of FIG. 1.--.

Column 3, line 31, "cement" should be --cermet--.

Column 3, line 54, "cement" should be --cermet--.

IN THE CLAIMS

Column 6, line 38, "cement" should be --cermet--.

Column 6, line 40, "cement" should be --cermet--.

Signed and Sealed this

Twenty-fourth Day of October, 1989

Attest:

DONALD J. QUIGG

Attesting Officer  Commissioner of Patents and Trademarks